Patented Feb. 14, 1950

2,497,433

UNITED STATES PATENT OFFICE 2,497,433

ALKYL ESTERS OF GLYCOL POLYCARBOXYLIC ACID ESTERS

Edward S. Blake, Nitro, W. Va., assignor to Monsanto Chemical Company, St. Louis, Mo., a corporation of Delaware No Drawing. Application June 11, 1947,
Serial No. 754,057

6 Claims. (Cl. 260—485)

This invention relates to alkyl esters of glycol bis aliphatic polycarboxylic acid esters.

The compounds of this invention are polyesters derived from polycarboxylic acids and monohydric alcohols. Because of the complex nature of their chemical composition, it is not possible to state their chemical structure with absolute certainty. The products may be mixtures of related materials. Separation and isolation of all the components has not yet been achieved but for most purposes the crude reaction products are entirely satisfactory. Therefore, the invention also relates to the crude reaction products of polyester materials produced by the methods herein described.

The general formula of the compounds of this invention is

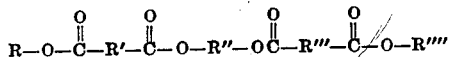

where R is an alkyl group, R', R'', R''' are the same or different divalent aliphatic chains and R'''' is hydrogen or an alkyl group.

Alkyl esters of a glycol bis alkylene dicarboxylic acid ester are conveniently prepared by reacting an anhydride of a dicarboxylic acid either with a glycol and then with a monohydric alcohol or with a monohydric alcohol and then with a glycol, leaving at least one hydroxyl group of the latter free, and finally condensing with a further quantity of anhydride. For example, succinic anhydride, a typical representative of a suitable anhydride, reacts vigorously with monoethylene glycol. It is believed that the reaction proceeds mainly in accordance with the following equation:

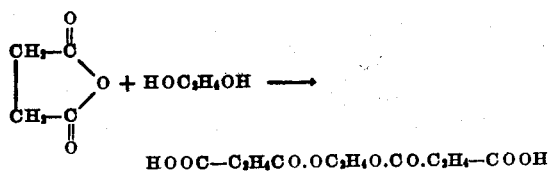

The dicarboxylic acid ester so produced is then treated with a monohydric alcohol to esterify one or both of the carboxyl groups.

Alternatively, the anhydride may first be condensed with a monohydric alcohol. Thus, again employing succinic anhydride as illustrative of a polycarboxylic anhydride and employing oleyl alcohol as illustrative of a monohydric alcohol, the reaction is represented by the following equation:

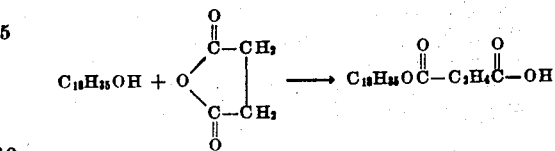

The monocarboxylic acid ester is then reacted with a glycol so as to leave at least one hydroxyl group of the latter free

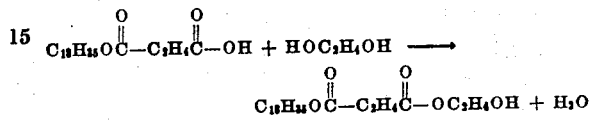

The monohydric ester alcohol is then reacted with a further quantity of anhydride to obtain the final product in accordance with the equation:

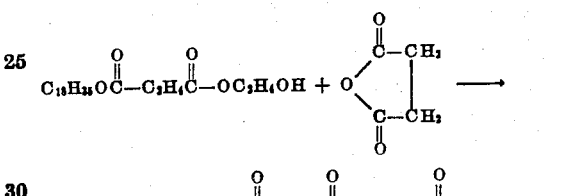

Polycarboxylic acids instead of the anhydrides may be used but the reaction with anhydrides provides a convenient method of controlling the reaction so as to esterify only one carboxyl group at a time, thereby permitting a second carboxyl group to be esterified with a different alcohol as required for the preparation of the new products.

A wide variety of alcohols have been successfully employed for the preparation of the polyesters of this invention. Typical examples of satisfactory alcohols are allyl alcohol, ethyl hexanol, stearoyl alcohol, oleyl or $\Delta^{9:10}$ octadecenyl alcohol, linoleyl or $\Delta^{9:10}$, $\Delta^{12:13}$, $\Delta^{15:16}$ octadecatrienyl alcohol, clupanodonyl alcohol, a 22 carbon non conjugated alcohol containing 6 double bonds derived from menhaden oil, and erucyl or $\Delta^{13:14}$ docosenyl alcohol. The long chain unsaturated alcohols are available from the reduction of fatty acid esters, as for example olive oil, linseed oil, tung oil, rapeseed oil, and marine oils.

The examples below illustrate the preparation of the new polyesters and are not to be taken as limitative of the invention.

Mono oleyl succinate

Into a container of suitable capacity there was charged 100 parts by weight of succinic anhydride and 268 parts by weight of oleyl alcohol (substantially one molecular proportion of each). A quantity of benzene was added sufficient to provide a refluxing temperature slightly above 100° C. The mixture was then heated at 100–103° for ten hours and the solvent removed by distillation under reduced pressure. More particularly, the mixture was heated up to 130° C./1–2 mm. to remove the benzene. The residue was then filtered and on cooling solidified to a waxy solid of neutralization number 151. The calculated neutralization number is 152.

Oleyl beta hydroxy ethyl succinate

Mono oleyl succinate, 161.9 parts by weight or 0.44 molecular proportion, and ethylene glycol, 124 parts by weight or 2.0 molecular proportions were mixed with toluene sufficient to impart a refluxing temperature of 140–150° C. The mixture was heated at refluxing temperature for seven hours, and then an additional 100 parts by weight of ethylene glycol and more toluene were added to impart a refluxing temperature of 170–180° C., and the mixture heated for nine hours at 170–180° C. During the reaction water and glycol were removed from the reaction zone and finally all the excess glycol was removed by vacuum stripping up to 160° C./1 mm. The residue was diluted with a solvent, as for example acetone, and filtered through a bed of clay after which the solvent was removed by vacuum stripping. The product had a neutralization number of zero indicating that complete esterification had been effected. It was a liquid at ordinary temperatures but solidified on refrigeration. The hydroxyl groups available for further esterification were somewhat more than the calculated value, probably due to the presence of free alcohol constituents not removed by the vacuum stripping. Thus, the Zerewitinoff method for determination of hydroxyl groups by methane evolution gave 27.3 cc. of methane as compared to a calculated value of 22.5 cc.

Example I

Into a container of suitable capacity provided with a reflux condenser there was charged substantially 69.4 parts by weight of the above oleyl beta hydroxy ethyl succinate and 20 parts by weight of succinic anhydride together with benzene in amount sufficient to impart a refluxing temperature of slightly above 100° C. The mixture was heated at about 105° C. for ten hours, then diluted with a mixture of petroleum ether and benzene and filtered through a bed of clay. The solvent was removed by distillation under reduced pressure. The product obtained as a residue was a yellow brown liquid readily soluble in mineral oil fractions and was believed to comprise mainly the mono oleyl ester of ethylene di-acid succinate.

Mono oleyl maleate

Into a container of suitable capacity there was charged 303.5 parts by weight (substantially 1.02 molecular proportions) of 90% oleyl alcohol and 98 parts by weight (substantially 1.0 molecular proportion) of maleic anhydride. The reactants were stirred and heated at 45–60° C. for nineteen hours. Temperatures of 100° C. and above are to be avoided as there is then considerable water split out, probably as the result of the formation of the neutral ester. The reaction mixture was cooled, diluted with petroleum ether, and filtered from a small amount of unreacted maleic anhydride admixed with a proportion of the desired mono ester.

The solvent was removed from the filtrate by vacuum distillation at 50–60°/7 mm. The residue was a clear yellow oil, neutralization number 124, saponification number 269. Determination of the hydroxyl substituents by Zerewitinoff method of methane evolution gave 59.2 cc. per gram. Assuming that the 2% excess oleyl alcohol employed in the initial charge remains in the final product and that the 10% of impurities present in the initial alcohol are present as inert ingredients, as they appear to be, the composition of the final crude product would be 89.9% of the desired mono ester, 10.4% inert ingredients, and 1.7% oleyl alcohol. Such a composition would have a neutralization number of 134, a saponification number of 270 and would evolve 55.2 cc. of methane per gram in the Zerewitinoff hydroxyl determination. The crude mono oleyl maleate so obtained was then reacted with ethylene glycol as described below.

The maleic anhydride can be readily removed from the other solids which precipitate from the reaction mixture by dissolving the combined solids in acetone and then pouring the acetone solution into a large excess of water. The maleic acid is removed from the water and the water insoluble solids filtered off and combined with the main proportion if desired. The mono oleyl maleate obtained from the water had a neutralization number of 157 as compared to the calculated value of 153.

Oleyl beta hydroxy ethyl maleate

Into a reaction vessel of suitable capacity fitted with a water trap and reflux condenser there was charged substantially 250 parts by weight of mono oleyl maleate, 425 parts by weight of ethylene glycol and benzene sufficient to provide a mixture which refluxed at 140–150° C. The mixture was then heated at reflux for 35 hours while water and glycol were stripped out. The excess glycol and solvent were then removed by vacuum distillation up to 169°/4 mm. The residue was diluted with a solvent, as for example petroleum ether, and filtered through a layer of clay, washed thoroughly and the solvent removed by vacuum distillation. The residue was a yellow brown oil comprising oleyl beta hydroxy ethyl maleate which by the Zerewitinoff hydroxyl determination gave 65.2 cc. methane per gram. It was reacted with maleic anhydride as described below employing that amount of the anhydride required to react with the hydroxyl groups actually present as determined by the aforementioned analysis.

Example II

Oleyl beta hydroxy ethyl maleate, 189.3 parts by weight, and maleic anhydride, 52.4 parts by weight, were admixed in a suitable reaction vessel and stirred and heated at 50–60° C. for twenty-four hours. The product was a clear yellow brown oil readily soluble in mineral oil fractions which was believed to comprise mainly the mono oleyl ester of ethylene di-acid maleate.

Example III

Into a reaction vessel of suitable capacity fitted with a water trap and reflux condenser there was charged 31 parts by weight of ethylene glycol (substantially 0.5 molecular proportion) and 100 parts by weight of succinic anhydride (substantially 1.0 molecular proportion). The mixture was warmed slightly whereupon a vigorous reaction set in. Cooling was applied to keep the temperature below 170° C. and then after the vigor of the reaction had subsided, stirring and heating were continued for two hours at 150° C. 268 parts by weight (substantially 1.0 molecular proportion) of oleyl alcohol was added together with a quantity of benzene sufficient to impart a temperature of reflux within the range of 128–148° C. The mixture was heated at 128–148° C. for seventeen and one-half hours during which time the water formed as a by-product of the esterification was removed from the reaction zone. The solvent was removed by distillation under reduced pressure and the residue treated with 6 parts by weight of calcium carbonate and 10 parts by weight of Attapulgus clay and filtered. The clear oil was again dissolved in a solvent such as petroleum ether and again clay treated after which the solvent was topped out by heating up to 120° C./4–5 mm. The product so obtained was an oily liquid readily soluble in mineral oil fractions and was believed to comprise mainly the di oleyl ester of ethylene di-acid succinate.

Mono octyl succinate

Into a container of suitable capacity there was charged 81.7 parts by weight (substantially 0.817 molecular proportion) of succinic anhydride and 106.3 parts by weight (substantially 0.817 molecular proportion) of 2-ethyl hexanol. A quantity of benzene was added sufficient to provide a refluxing temperature of about 105° C. and the mixture was heated at refluxing temperature for six hours and the solvent stripped out by heating to 153° C./10 mm. The residue was diluted with petroleum ether, filtered, and the solvent again removed as described. The residue was a white waxy solid which had a neutralization number of 234 as compared to a calculated value of 244. The gas evolved in the Zerewitinoff method for determination of hydroxyl groups was 98.3 cc./g. as compared to a calculated value of 97.5 cc./g.

Octyl beta hydroxy ethyl succinate

Mono octyl succinate, 169 parts by weight, and ethylene glycol, 456 parts by weight, were mixed with benzene sufficient to impart a refluxing temperature of 140–150° C. The mixture was heated at refluxing temperature for about forty-two hours during which time water and excess glycol were gradually removed. The residue was dissolved in benzene, filtered through a bed of clay and the solvent stripped out by heating at 95°/5 mm. The resulting product had a neutralization number of 4.3.

Example IV

Octyl beta hydroxy ethyl succinate prepared as described above, 134.1 parts by weight, and succinic anhydride, 40 parts by weight, were heated at 100–110° C. for twenty-four hours. The resulting reaction product was a clear orange brown liquid believed to comprise mainly the mono octyl ester of ethylene di-acid succinate.

Mono octadecyl succinate

Mono octadecyl succinate was prepared by heating 273 parts by weight of octadecyl alcohol, 100 parts by weight of succinic anhydride and a small amount of benzene at 106–107° C. for eight and one-fourth hours.

Octadecyl beta hydroxy ethyl succinate 332 parts by weight of the above mono octadecyl succinate, 640 parts by weight of ethylene glycol and a little toluene were heated twenty-eight hours at 149°–160° C. under reflux with a water separator. The top layer was then separated and the solvent stripped out by heating up to 157° C./1 mm. The resulting product had a neutralization number of zero. It evolved 53.5 cc./g. of methane by the Zerewitinoff method of hydroxyl determination as compared to a calculated value of 54.2 cc./g.

Example V 127.5 parts by weight of the above octadecyl beta hydroxy ethyl succinate and 30 parts by weight of succinic anhydride were heated at 104°–122° C. for twenty and one-half hours. The reaction mixture was dissolved in ether, the ether solution filtered and cooled and the product filtered off. The white crystalline product, M. P. 62–63° C., had a neutralization number of 91.3. The calculated value is 109. This product was believed to comprise mainly the mono octadecyl ester of ethylene di-acid succinate.

Oleyl beta (beta hydroxy ethoxy) ethyl succinate 324 parts by weight of mono oleyl succinate, 1000 parts by weight of diethylene glycol and toluene sufficient to regulate the temperature were heated for twenty-six and three-fourths hours at 170–175° C. under reflux with a water separator. Water was added and the bottom layer drawn off and discarded. The upper layer was washed repeatedly with water to remove the diethylene glycol and finally heated to 95° C./2 mm.

Example VI

The above product, 137 parts by weight, and succinic anhydride, 30 parts by weight, were heated twenty and one-half hours at 103–112° C. The reaction mixture was dissolved in petroleum ether, filtered, and the solvent removed by distillation. The light amber residue partially solidified on standing. This product was believed to comprise the mono oleyl ester of 2,2′ oxybisethanol di-acid succinate.

Allyl beta hydroxy ethyl succinate

Mono allyl succinate was prepared by reacting allyl alcohol and succinic anhydride. 313 parts by weight of the mono allyl succinate so prepared, 1500 parts by weight of glycol and a small amount of benzene were heated eight hours at 135–148° C. under reflux with a water separator after which time the neutralization number of the reaction mixture was 2.1. Most of the solvent was removed by distillation and the residue after cooling to 60° C. was filtered through a bed of Attapulgus clay. The filtered product was then heated at 148° C./1 mm. to remove the remainder of the solvent.

Example VII 70 parts by weight of the above allyl beta hydroxy ethyl succinate and 30 parts by weight of succinic anhydride were heated at 103–120° C. for five and one-half hours. No succinic anhydride sublimed out upon heating at 130° C./1 mm. The reaction product was believed to comprise the allyl ester of ethylene di-acid succinate.

The new polyesters have a variety of industrial uses. They are valuable for compounding turbine oils to impart rust inhibiting properties and such use is disclosed and claimed in my co-pending application Serial No. 739,247 filed April 3, 1947. In addition, they are plasticizers for rubber and resins.

Although the invention has been described and illustrated with respect to certain preferred examples, the invention is not restricted to these specific examples.

What is claimed is:

1. An ester of the structure

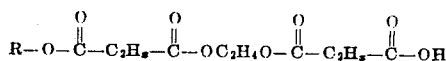

where R is an unsaturated alkyl radical containing at least 3 but not more than 18 carbon atoms and where $x$ is an even number less than five.

2. The method of making a polyester of the structure

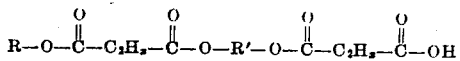

where R is an unsaturated alkyl radical containing at least 3 but not more than 18 carbon atoms, where $x$ is an even number less than five, where R' is selected from the group consisting of —C₂H₄— and —C₂H₄OC₂H₄—, which comprises reacting a mono unsaturated aliphatic alcohol ester of a four carbon atom dicarboxylic acid with a dihydric alcohol selected from the group consisting of ethylene glycol and diethylene glycol to produce a di-ester alcohol and condensing this product with an anhydride of a four carbon atom dicarboxylic acid, said unsaturated aliphatic alcohol containing not less than 3 nor more than 18 carbon atoms.

3. The method of making a polyester of the structure

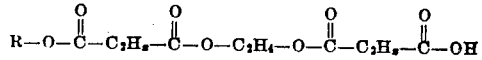

where R is an unsaturated alkyl radical containing at least 3 but not more than 18 carbon atoms, where $x$ is an even number less than five, which comprises reacting a mono unsaturated alkyl beta-hydroxy-ethyl di-ester of a four carbon atom dicarboxylic acid with an anhydride of a four carbon atom dicarboxylic acid, said mono alkyl group containing not less than 3 nor more than 18 carbon atoms.

4. The method of making a polyester of the structure

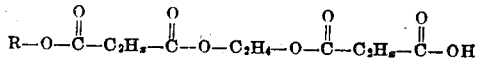

where R is an oleyl radical, where $x$ is an even number less than five, which comprises reacting a mono oleyl beta-hydroxy-ethyl di-ester of a four carbon dicarboxylic acid with an anhydride of a four carbon atom dicarboxylic acid.

5. As a new composition of matter the mono-oleyl ester of ethylene di-acid succinate

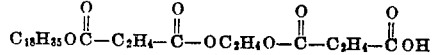

6. As a new composition of matter the mono-oleyl ester of ethylene di-acid maleate

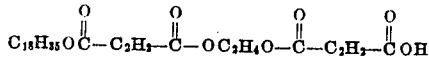

EDWARD S. BLAKE.

REFERENCES CITED

The following references are of record in the file of this patent:

UNITED STATES PATENTS

| Number | Name | Date |
|---|---|---|
| 2,035,528 | Brubaker | Mar. 31, 1936 |
| 2,075,107 | Frazier | Mar. 30, 1937 |
| 2,363,045 | De Groote | Nov. 21, 1944 |
| 2,379,251 | Muskat | June 26, 1945 |
| 2,392,621 | Strain | Jan. 8, 1946 |